United States Patent
Allely et al.

(10) Patent No.: US 11,654,653 B2
(45) Date of Patent: May 23, 2023

(54) METHOD FOR THE MANUFACTURING OF LIQUID METAL EMBRITTLEMENT RESISTANT GALVANNEALED STEEL SHEET

(71) Applicant: ArcelorMittal, Luxembourg (LU)

(72) Inventors: Christian Allely, Metz (FR); Pascal Bertho, Yutz (FR); Anirban Chakraborty, Chesterton, IN (US); Hassan Ghassemi-Armaki, Schererville, IN (US)

(73) Assignee: ArcelorMittal, Luxembourg (LU)

(*) Notice: Subject to any disclaimer, the term of this patent is extended or adjusted under 35 U.S.C. 154(b) by 298 days.

(21) Appl. No.: 16/605,473

(22) PCT Filed: Apr. 25, 2018

(86) PCT No.: PCT/IB2018/000429
§ 371 (c)(1),
(2) Date: Oct. 15, 2019

(87) PCT Pub. No.: WO2018/203126
PCT Pub. Date: Nov. 8, 2018

(65) Prior Publication Data
US 2020/0123674 A1 Apr. 23, 2020

(30) Foreign Application Priority Data
May 5, 2017 (WO) .................. PCT/IB2017/000520

(51) Int. Cl.
| | | |
|---|---|---|
| *C25D 5/12* | (2006.01) | |
| *B23K 11/11* | (2006.01) | |
| *C22C 38/02* | (2006.01) | |
| *C22C 38/04* | (2006.01) | |
| *C25D 5/50* | (2006.01) | |
| *C21D 8/02* | (2006.01) | |
| *C23C 10/28* | (2006.01) | |
| *C25D 3/12* | (2006.01) | |
| *C21D 9/46* | (2006.01) | |
| *C25D 3/22* | (2006.01) | |
| *C22C 38/06* | (2006.01) | |
| *B32B 15/01* | (2006.01) | |

(52) U.S. Cl.
CPC ............ *B32B 15/011* (2013.01); *B23K 11/11* (2013.01); *C21D 8/0273* (2013.01); *C21D 9/46* (2013.01); *C22C 38/02* (2013.01); *C22C 38/04* (2013.01); *C22C 38/06* (2013.01); *C23C 10/28* (2013.01); *C25D 3/12* (2013.01); *C25D 3/22* (2013.01); *C25D 5/12* (2013.01); *C25D 5/50* (2013.01)

(58) Field of Classification Search
CPC ..... B23K 11/11; B32B 15/011; B32B 15/012; B32B 15/013; C21D 8/0273; C21D 9/46; C22C 38/02; C22C 38/04; C22C 38/06; C23C 10/28; C23C 2/02; C23C 2/06; C23C 2/28; C25D 3/12; C25D 3/22; C25D 5/12; C25D 5/50; C25D 7/0614
See application file for complete search history.

(56) References Cited

U.S. PATENT DOCUMENTS

| | | |
|---|---|---|
| 9,234,268 B2 | 1/2016 | Kawata et al. |
| 2008/0283154 A1 | 11/2008 | Taniguchi et al. |
| 2009/0211668 A1 | 8/2009 | Ishizuka et al. |
| 2012/0100391 A1 | 4/2012 | Lee et al. |
| 2014/0342183 A1 | 11/2014 | Wakabayashi et al. |
| 2015/0314568 A1* | 11/2015 | Takahashi ............... C22C 38/54 428/659 |
| 2016/0082701 A1 | 3/2016 | Kurosaki et al. |
| 2016/0208355 A1 | 7/2016 | Nakagaito et al. |
| 2016/0319415 A1 | 11/2016 | Lee et al. |
| 2017/0253941 A1 | 9/2017 | Cobo et al. |

FOREIGN PATENT DOCUMENTS

| | | |
|---|---|---|
| EP | 1707645 A1 | 10/2006 |
| EP | 1354970 B1 | 2/2011 |
| EP | 2631319 A1 | 8/2013 |
| EP | 2762592 A1 | 8/2014 |

(Continued)

OTHER PUBLICATIONS

Liu effect of dew point on the surface selective oxidation and subsurface microstructure of TRIP-aided steel (Year: 2011).*
International Search Report issued in connection with International application No. PCT/IB2018/000429 dated Nov. 3, 2018.
International Search Report issued in connection with International application No. PCT/IB2017/000520 dated Jun. 2, 2018.

*Primary Examiner* — Jenny R Wu
(74) *Attorney, Agent, or Firm* — Davidson, Davidson & Kappel, LLC

(57) ABSTRACT

The present invention relates to a method for the manufacture of a galvannealed steel sheet including the steps of A.) coating of the steel sheet with a first coating consisting of nickel and having a thickness between 150 nm and 650 nm, the steel sheet having the following composition in weight percentage 0.10<C<0.40%, 1.5<Mn<3.0%, 0.7<Si<3.0%, 0.05<Al<1.0%, 0.75<(Si+Al)<3.0%, and on a purely optional basis, one or more elements such as Nb≤0.5%, B≤0.010%, Cr≤1.0%, Mo≤0.50%, Ni≤1.0%, Ti≤0.5%, the remainder of the composition is made up of iron and inevitable impurities resulting from the elaboration, B.) annealing of the coated steel sheet being annealed at a temperature between 600 to 1200° C., C.) coating of the steel sheet obtained in step B.) with a second coating based on zinc and D.) an alloying heat treatment to form a galvannealed steel sheet.

13 Claims, No Drawings

(56) References Cited

FOREIGN PATENT DOCUMENTS

| | | | |
|---|---|---|---|
| EP | 3088557 | A1 | 11/2016 |
| JP | 2561331 | B2 * | 12/1996 |
| JP | 2006299340 | A | 11/2006 |
| JP | 2008144264 | A * | 6/2008 |
| KR | 20150073317 | | 7/2015 |
| KR | 20170029012 | A | 3/2017 |
| RU | 2569615 | C2 | 11/2015 |
| RU | 2603762 | C2 | 11/2016 |

* cited by examiner

US 11,654,653 B2

METHOD FOR THE MANUFACTURING OF LIQUID METAL EMBRITTLEMENT RESISTANT GALVANNEALED STEEL SHEET

The present invention relates to a method for the manufacture of a galvannealed steel sheet. The invention is particularly well suited for the manufacture of automotive vehicles.

BACKGROUND

Zinc based coatings are generally used because they allow for a protection against corrosion, thanks to barrier protection and cathodic protection. The barrier effect is obtained by the application of a metallic or non-metallic coating on steel surface. Thus, the coating prevents the contact between steel and corrosive atmosphere. The barrier effect is independent from the nature of the coating and the substrate. On the contrary, sacrificial cathodic protection is based on the fact that zinc which is active metal as compared to steel as per EMF series. Thus, if corrosion occurs, zinc is consumed preferentially as compared to steel. Cathodic protection is essential in areas where steel is directly exposed to corrosive atmosphere, like cut edges where surrounding zinc consumes before the steel.

However, when heating steps are performed on such zinc coated steel sheets, for example during hot press hardening or resistance spot welding, cracks are observed in the steel which initiates from the steel/coating interface. Indeed, occasionally, there is a reduction of mechanical properties due to the presence of cracks in the coated steel sheet after the above operation. These cracks appear with the following conditions: high temperature above the melting point of coating materials; contact with a liquid metal having a low melting point (such as zinc) in addition to the presence of tensile stress; diffusion and wetting of molten metal with substrate steel grain and grain boundaries. The designation for such phenomenon is known as liquid metal embrittlement (LME), and also called liquid metal assisted cracking (LMAC).

The patent application publication US2016/0319415 discloses a hot-dip galvanized steel sheet having excellent resistance to cracking due to liquid metal embrittlement, comprising:

a base steel sheet having a microstructure in which an austenite fraction is 90 area % or more; and a hot-dip galvanizing layer formed on the base steel sheet, wherein the hot-dip galvanizing layer includes an Fe—Zn alloy layer, and a Zn layer formed on the Fe—Zn alloy layer, and the Fe—Zn alloy layer has a thickness of $[(3.4 \times t)/6]$ μm or more, where t is a thickness of the hot-dip galvanizing layer.

In this publication, it is mentioned that occurrence of cracking caused by LME may be prevented by suppressing the formation of a surface oxide used to suppress the diffusion of iron (Fe) and a Fe—Al or Fe—Al—Zn alloy layer, and by forming an Fe—Zn alloy layer having a sufficient thickness in the hot-dip galvanizing layer.

To ensure plating adhesion, it is preferable that a Fe—Ni alloy layer is further included directly below a surface of the base steel sheet. More particularly, the Fe—Ni alloy layer may ensure excellent plating adhesion as MnO or the like exists as an internal oxide by suppressing a surface oxide such as MnO or the like from being formed, as an oxidizing element such as Mn or the like is enriched on a surface of the Fe—Ni alloy layer, in the manner of TWIP steel. To ensure the above effect, the Fe—Ni alloy layer may be formed due to 300 mg/m² to 1000 mg/m² Ni coating layer. However, this patent application discloses a solution only dedicated to TWIP steels.

The patent application publication US2012/0100391 discloses a method for manufacturing a hot-dip galvanized steel sheet having excellent plating qualities, plating adhesion and spot weldability, the method comprising:

coating a base steel sheet with Ni in a coating amount ($C_{Ni}$) of 0.1-1.0 g/m², i.e. around 11 to 112 nm;

heating the Ni-coated steel sheet in a reducing atmosphere;

cooling the heated steel sheet to the temperature ($X_S$) at which the steel sheet is fed into a galvanizing bath; and feeding and immersing the cooled steel sheet in the galvanizing bath having an effective Al concentration ($C_{Al}$) of 0.11-0.14 wt % and a temperature (Tp) of 440-460° C., wherein the temperature ($X_S$) at which the steel sheet is fed into the galvanizing bath satisfies the following relationship: $C_{Ni} \cdot (X_S - T_P)/2C_{Al} = 5-100$.

The publication also discloses a hot-dip galvanized steel sheet in which an Fe—Ni—Zn alloy phase that accounts for 1-20% of the cross-sectional area of the galvanized layer is formed at the interface between the base steel sheet and the galvanized layer.

It is mentioned that in the case of a high-strength galvanized steel sheet obtained by plating zinc on an Ni layer plated on a base steel sheet, if the fraction of the area covered by the Fe—Ni—Zn alloy phase formed at the interface between the base steel sheet and the galvanized layer is controlled at a specific level, the plating qualities of the steel sheet will be reduced, and the galvanized layer will be prevented from being exfoliated during a forming process, suggesting that the plating adhesion of the steel sheet will be improved. In addition, in a spot welding process during which an electric current is applied from an electrode through the Fe—Ni alloy layer to the base steel sheet, Fe will be instantaneously diffused from the steel sheet to form an Fe—Ni—Zn alloy phase, such that the alloying between the electrode and the galvanized layer will be delayed, thus increasing the service life of the welding electrode.

However, although the spot welding process is improved, no improvement of LME is mentioned.

Due to presence of several advantages, galvannealed coating is applied on steel. However, during hot press hardening or resistance spot welding above galvannealed coated steel sheet shows LME cracks.

SUMMARY OF THE INVENTION

It is an object of the present to provide a galvannealed steel sheet which does not have LME issues. It aims to make available, in particular, an easy to implement method in order to obtain an assembly which does not have LME issues after the hot press forming and/or the welding.

Another object of the present invention is to provide a galvannealed steel sheet.

Another object is to provide a spot welded joint.

Another object is to provide the use of the steel sheet or the assembly for the manufacture of an automotive vehicle.

Other characteristics and advantages of the invention will become apparent from the following detailed description of the invention.

The designation "steel" or "steel sheet" means a steel sheet, a coil, a plate having a composition allowing the part to achieve a tensile strength up to 2500 MPa and more preferably up to 2000 MPa. For example, the tensile strength is above or equal to 500 MPa, preferably above or equal to 980 MPa, advantageously above or equal to 1180 MPa and even above or equal 1470 MPa.

The invention provides a method for the manufacture of a galvannealed steel sheet comprising the following successive steps:

A. the coating of the steel sheet with a first coating consisting of nickel and having a thickness between 150 nm and 650 nm, said steel sheet having the following composition in weight percentage:
0.10<C<0.40%,
1.5<Mn<3.0%,
0.7<Si<3.0%,
0.05<Al<1.0%,
0.75<(Si+Al)<3.0%,
and on a purely optional basis, one or more elements such as
Nb≤0.5%,
B≤0.010%,
Cr≤1.0%,
Mo≤0.50%,
Ni≤1.0%,
Ti≤0.5%,
the remainder of the composition making up of iron and inevitable impurities resulting from the elaboration,
B. the annealing of said coated steel sheet at a temperature between 600 to 1200° C.,
C. the coating of the steel sheet obtained in step B) with a second coating based on zinc and
D. an alloying heat treatment to form a galvannealed steel sheet.

Without willing to be bound by any theory, it seems that during the thermal treatment in step B), Ni having the specific thickness diffuses towards the steel sheet having the above specific steel composition allowing a Fe—Ni alloy layer. On the other hand, some amount of Ni is still present at the interface between the steel and the coating preventing liquid zinc or zinc alloy penetration into steel during any heating steps for example a welding. Moreover, during the alloying treatment, i.e. step D), Ni also diffuses in the overlying coating and thus prevents LME.

The first coating consisting of nickel is deposited by any deposition method known by the person skilled in the art. It can be deposited by vacuum deposition or electro-plating method. Preferably, it is deposited by an electro-plating method.

Optionally, the first coating can comprise impurities chosen from: Fe, Cu, Mn, Si, Al and P. For example, the amount of the impurities is below 5%, preferably below 3% and more preferably below 1%.

The first coating consisting of nickel has a thickness between 150 nm and 650 nm, preferably between 200 and 500 nm, more preferably between 250 and 450 nm, advantageously between 300 and 450 nm and for example between 350 and 450 nm. For example, the first coating consisting of nickel has a thickness between 250 and 650 nm. Indeed, without willing to be bound by any theory, the inventors have surprisingly found that there is an optimum on the thickness of the first coating wherein LME reduction is highly improved. It is believed that this optimum thickness allows for a reduction of the welding current and therefore of the amount of heat input during spot welding. Consequently, a significant reduction of number of crack formations due to LME is obtained.

Advantageously, in step B), the thermal treatment is a continuous annealing. For example, the continuous annealing comprises a heating, a soaking and a cooling step. It can further comprise a pre-heating step.

Preferably, the thermal treatment is performed in an atmosphere comprising from 1 to 10% of $H_2$ at a dew point between −60 and −30° C. For example, the atmosphere comprises from 1 to 10% of $H_2$ at a dew point between −40° C. and −60° C.

In another preferred embodiment, in step B), the thermal treatment is performed in an atmosphere comprising from 1 to 10% of $H_2$ at a dew point between −30 and +30° C. For example, the atmosphere comprises from 1 to 10% of $H_2$ at a dew point between 0° C. and +20° C.

Preferably, in step C), the second layer comprises above 50% of zinc, more preferably above 75% of zinc and advantageously above 90% of zinc. The second layer can be deposited by any deposition method known by the person skilled in the art. It can be done by a hot-dip method, by vacuum deposition or by an electro-galvanizing process.

For example, the coating based on zinc comprises from 0.01 to 8.0% Al, optionally 0.2-8.0% Mg, the remainder being Zn.

In another preferred embodiment, the second layer consists of zinc. When the coating is deposited by hot-dip galvanizing, the percentage of Aluminum is comprised between 0.10 and 0.18 wt. % in the bath.

Preferably, the coating based on zinc is deposited by a hot-dip galvanizing method. In this embodiment, the molten bath can also comprise unavoidable impurities and residuals elements from feeding ingots or from the passage of the steel sheet in the molten bath. For example, the optional impurities are chosen from Sr, Sb, Pb, Ti, Ca, Mn, Sn, La, Ce, Cr, Zr or Bi, the content by weight of each additional element being inferior to 0.3% by weight. The residual elements from feeding ingots or from the passage of the steel sheet in the molten bath can be iron with a content up to 0.1% weight.

Advantageously, in step C), the second layer does not comprise nickel.

Preferably, in step D), the alloying heat treatment is performed by heating the coated steel sheet obtained in step C) at a temperature between 470 and 550° C. during, for example, 5 to 50 seconds. For example, step D is performed at 520° C. for 20 seconds.

With the method according to the present invention, a galvannealed steel sheet coated with a first layer comprising nickel directly topped by a second layer based on zinc, the first and second layers being alloyed through diffusion such that the second alloy layer comprising from 8 to 50 wt. % of iron, from 0 to 25 wt. % of nickel, the balance being zinc, is obtained. Preferably, the galvannealed steel sheet is coated with a first layer comprising nickel directly topped by a second layer based on zinc, the first and second layers being alloyed through diffusion such that the second alloy layer comprising from 12 to 50 wt. % of iron, from 1 to 25 wt. % of nickel, the balance being zinc. Advantageously, the galvannealed steel sheet is coated with a first layer comprising nickel directly topped by a second layer based on zinc, the first and second layers being alloyed through diffusion such that the second alloy layer comprising from 13 to 50 wt. % of iron, from 1 to 25 wt. % of nickel, the balance being zinc.

Preferably, the steel sheet has a microstructure comprising from 1 to 50% of residual austenite, from 1 to 60% of martensite and optionally at least one element chosen from: bainite, ferrite, cementite and pearlite.

In a preferred embodiment, the steel sheet has a microstructure comprising from 5 to 25% of residual austenite.

Preferably, the steel sheet has a microstructure comprising from 1 to 60% and more preferably between 10 to 60% of tempered martensite.

Advantageously, the steel sheet has a microstructure comprising from 10 to 40% of bainite, such bainite comprising from 10 to 20% of lower bainite, from 0 to 15% of upper bainite and from 0 to 5% of carbide free bainite.

Preferably, the steel sheet has a microstructure comprising from 1 to 25% of ferrite.

Preferably, the steel sheet has a microstructure comprising from 1 to 15% untempered martensite.

After the manufacture of a steel sheet, in order to produce some parts of a vehicle, it is known to assemble by spot welding two metal sheets.

To produce a spot welded joint according to the invention, the welding is performed with an effective intensity between 3 kA and 15 kA and the force applied on the electrodes is between 150 and 850 daN with said electrode active face diameter being between 4 and 10 mm.

Thus, a spot welded joint of at least two metal sheets, comprising the coated steel sheet according to the present invention, is obtained, such said joint containing less than 3 cracks having a size above 100 μm and wherein the longest crack has a length below 300 μm.

Preferably, the second metal sheet is a steel sheet or an aluminum sheet. More preferably, the second metal sheet is a steel sheet according to the present invention.

In another embodiment, the spot welded joint comprises a third metal sheet being a steel sheet or an aluminum sheet. For example, the third metal sheet is a steel sheet according to the present invention.

The steel sheet or the spot welded joint according to the present invention can be used for the manufacture of parts for automotive vehicles.

The invention will now be explained in trials carried out for information only. They are not limiting.

EXAMPLE

For all samples, the steel sheets used have the following composition in weight percent: C=0.37%, Mn=1.95%, Si=1.95%, Cr=0.35% and Mo=0.12%.

In Trial 1, steel was annealed in an atmosphere comprising 5% of $H_2$ and 95% of $N_2$ at a dew point of −45° C. The annealing was carried out at 900° C. for 132 seconds. After the annealing, the steel sheet was cooled to room temperature. On the annealed steel sheet Zinc coating was applied by electro-galvanizing method.

In Trials 2 to 5, Ni was first deposited by an electroplating method having a thickness of 150, 400, 650 and 900 nm respectively on full hard steel sheets before annealing. After that, the pre-coated steel sheets were annealed in an atmosphere comprising 5% of $H_2$ and 95% of $N_2$ at a dew point of −45° C. The annealing was carried out at 900° C. for 132 seconds. At the end of the annealing, the steel sheets were cooled to quench temperature of 210° C. and again heated at partitioning temperature of 410° C. Portioning was carried out for 88 s and then again heated up to galvanizing temperature of 460° C. and Zinc coating was applied by hot dip coating method using a liquid Zinc bath containing 0.12 wt. % Al maintained at 460° C. Just after the galvanizing, an alloying heat treatment was carried out at 520° C. for 20 seconds.

The susceptibility of LME of above coated steel was evaluated by resistance spot welding method. To this end, for each Trial, two coated steel sheets were welded together by resistance spot welding. The type of the electrode was ISO Type B with a diameter of 16 mm; the force of the electrode was of 5 kN and the flow rate of water of was 1.5 g/min., the welding cycle was reported in Table 1:

TABLE 1

| | | Welding schedule | | |
|---|---|---|---|---|
| Weld time | Pulses | Pulse (cy) | Cool time (cy) | Hold time (cy) |
| Cycle | 2 | 12 | 2 | 15 |

The LME crack resistance behavior was also evaluated using a 3 layer stack-up condition. For each Trial, three coated steel sheets were welded together by resistance spot welding. The number of cracks 100 μm was then evaluated using an optical microscope as reported in Table 2.

TABLE 2

| | LME crack details after spot welding (3 layer stack-up condition) | |
|---|---|---|
| Trials | Number of cracks per spot weld (>100 μm) | Maximum crack length (μm) |
| Trial 1 | 6.8 | 850 |
| Trial 2* | 1.3 | 235 |
| Trial 3* | 2.2 | 215 |
| Trial 4* | 2.4 | 219.5 |
| Trial 5 | 1 | 399.6 |

*according to the present invention.

Trials 2, 3 and 4 according to the present invention show an excellent resistance to LME as compared to Trials 1 and 5. Indeed, the number of cracks above 100 μm is below 3 and the longest crack has a length below 300 μm. Moreover, Trials 2 to 4 having an optimum Ni coating thickness reduces the welding current. It results in a reduction of the amount of heat input during spot welding and thus causes a significant reduction of number of crack formations due to LME.

The invention claimed is:

1. A method for the manufacture of a galvannealed steel sheet comprising the following successive steps:
    A) coating a steel sheet with a first coating consisting of nickel and having a thickness between 200 nm and 500 nm, said steel sheet having a composition including in weight percentage:
       0.10<C<0.40%,
       1.5<Mn<3.0%,
       0.7<Si<3.0%,
       0≤Nb≤0.5%,
       0≤B≤0.010%,
       0≤Cr≤1.0%,
       0≤Mo≤0.50%,
       0≤Ni≤1.0%,
       0≤Ti≤0.5%,
    a remainder of the composition being iron and inevitable impurities resulting from the processing;
    B) annealing the coated steel sheet at a temperature between 600 to 1200° C. in an atmosphere comprising from 1 to 10% of $H_2$ at a dew point between −60 and −30° C.;
    C) coating the steel sheet obtained in step B) with a second coating based on zinc; and
    D) subjecting the steel sheet obtained in step C) to an alloying heat treatment to form a galvannealed steel sheet.

2. The method according to claim 1, wherein in step A), the steel sheet further comprises 0.05<Al<1.0% and 0.75<(Si+Al)<3.0%.

3. The method according to claim 2, wherein in step A), the first coating has a thickness between 250 and 450 nm.

4. The method according to claim 1, wherein in step B), the annealing is a continuous annealing.

5. The method according to claim 1, wherein in step C), the second coating comprises above 50% of zinc.

6. The method according to claim 5, wherein in step C), the second coating comprises above 75% of zinc.

7. The method according to claim 6, wherein in step C), the second coating comprises above 90% of zinc.

8. The method according to claim 1, wherein the second coating does not comprise nickel.

9. The method according to claim 8, wherein in step C), the second coating consists of zinc.

10. The method according to claim 1, wherein in step D) the alloying treatment is performed by heating the coated steel sheet obtained in step C) at a temperature between 470 and 550° C.

11. The method according to claim 1, wherein the steel sheet obtained in step B) is cooled prior to step C).

12. The method according to claim 1, wherein the steel sheet obtained in step B) is cooled to quench temperature of 210° C.

13. The method according to claim 1, wherein the steel sheet obtained in step B) is cooled to room temperature.

* * * * *